(12) United States Patent
Kanegae

(10) Patent No.: US 10,875,488 B2
(45) Date of Patent: Dec. 29, 2020

(54) PASSENGER PROTECTION APPARATUS

(71) Applicant: SUBARU CORPORATION, Tokyo (JP)

(72) Inventor: Shota Kanegae, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 16/202,744

(22) Filed: Nov. 28, 2018

(65) Prior Publication Data

US 2019/0299916 A1 Oct. 3, 2019

(30) Foreign Application Priority Data

Mar. 28, 2018 (JP) .................................. 2018-061872

(51) Int. Cl.
| | | |
|---|---|---|
| *B60R 21/2338* | (2011.01) | |
| *B60R 21/214* | (2011.01) | |
| *B60R 21/015* | (2006.01) | |
| *B60R 21/231* | (2011.01) | |
| *B60R 21/00* | (2006.01) | |

(52) U.S. Cl.
CPC .... *B60R 21/2338* (2013.01); *B60R 21/01512* (2014.10); *B60R 21/214* (2013.01); *B60R 21/231* (2013.01); *B60R 2021/0032* (2013.01); *B60R 2021/23161* (2013.01)

(58) Field of Classification Search
CPC .............. B60R 21/2338; B60R 21/214; B60R 21/01512; B60R 21/015; B60R 21/231; B60R 21/232; B60R 21/213; B60R 2021/23161; B60R 2021/0032; B60R 2021/23386; B60R 2021/23308; B60R 2021/23107; B60R 2021/23192
USPC .................................................... 280/730.1
See application file for complete search history.

(56) References Cited

U.S. PATENT DOCUMENTS

| | | | | |
|---|---|---|---|---|
| 3,795,412 A | * | 3/1974 | John | ............ B60R 21/232 |
| | | | | 280/730.1 |
| 6,817,626 B2 | | 11/2004 | Boll et al. | |
| 9,725,064 B1 | * | 8/2017 | Faruque | ............ B60N 2/143 |
| 9,744,932 B1 | * | 8/2017 | Faruque | ............ B60R 21/16 |
| 2002/0166710 A1 | | 11/2002 | Breed | |

(Continued)

FOREIGN PATENT DOCUMENTS

| | | |
|---|---|---|
| DE | 10 2014 213296 A1 | 1/2016 |
| FR | 2667831 A1 * 4/1992 | ........... B60R 21/232 |

(Continued)

OTHER PUBLICATIONS

Japanese Office Action dated Sep. 3, 2019 for Japanese Patent Application No. 2018-061872 (4 pages in Japanese with English Translation).

(Continued)

*Primary Examiner* — Keith J Frisby
(74) *Attorney, Agent, or Firm* — Smith, Gambrell & Russell, LLP

(57) ABSTRACT

A passenger protection apparatus includes an inflator and an airbag. The inflator is configured to supply gas. The airbag is configured to deploy to surround a sitting position of a passenger by the gas supplied from the inflator. One end of the airbag is supported on an upper portion of a vehicle, and the other end of the airbag contacts an in-vehicle member and is supported by the in-vehicle member.

20 Claims, 6 Drawing Sheets

(56) References Cited

U.S. PATENT DOCUMENTS

| | | |
|---|---|---|
| 2004/0188988 A1 | 11/2004 | Wipasuramonton et al. |
| 2009/0295131 A1* | 12/2009 | Kim ................... B60R 21/231 |
| | | 280/730.1 |
| 2013/0001934 A1 | 1/2013 | Nagasawa et al. |
| 2017/0267204 A1 | 9/2017 | Faroq et al. |
| 2017/0291569 A1 | 10/2017 | Sugie |
| 2019/0016293 A1 | 1/2019 | Saso |
| 2019/0071046 A1 | 3/2019 | Dry et al. |
| 2019/0152359 A1* | 5/2019 | Spahn ................ B60R 21/0136 |
| 2019/0176739 A1 | 6/2019 | Song |
| 2019/0241141 A1* | 8/2019 | Sirous ................ B60R 21/232 |
| 2019/0275974 A1 | 9/2019 | Yetukuri et al. |
| 2019/0275979 A1 | 9/2019 | Dry |
| 2019/0299910 A1 | 10/2019 | Kanegae et al. |
| 2019/0337479 A1* | 11/2019 | Hill ................... B60R 21/231 |
| 2019/0381968 A1 | 12/2019 | Kwon |
| 2020/0017059 A1* | 1/2020 | Choi ................... B60R 21/232 |
| 2020/0070763 A1* | 3/2020 | Hill ................... B60R 21/232 |

FOREIGN PATENT DOCUMENTS

| | | | |
|---|---|---|---|
| JP | 2004-106772 A | | 4/2004 |
| JP | 2004106772 A | * | 4/2004 |
| JP | 2009-001177 A | | 1/2009 |
| JP | 2010-247661 A | | 11/2010 |
| JP | 2013-014176 | | 1/2013 |
| JP | 2015-067123 | | 4/2015 |
| JP | 2017/100552 A | | 6/2017 |
| WO | 2012-144748 A2 | | 10/2012 |
| WO | WO-2015145285 A1 * | 10/2015 | ........ B60R 21/233 |

OTHER PUBLICATIONS

Office Action for Japanese Patent Application No. 2018-061873 dated Aug. 27, 2019 (4 pages in Japanese English Translation).

* cited by examiner

PASSENGER PROTECTION APPARATUS

The present application claims priority from Japanese Patent Application No. 2018-061872 filed on Mar. 28, 2018, the entire contents of which are hereby incorporated by reference.

BACKGROUND

1. Technical Field

The present invention relates to a passenger protection apparatus.

2. Related Art

In order to protect a passenger from a collision and so forth, a seatbelt apparatus and an airbag apparatus have been used in a vehicle such as an automobile. As this airbag apparatus, a front airbag configured to deploy backward in front of the passenger has been known. This front airbag is deployed at a frontal collision of the vehicle to support and protect the passenger moving forward, which is disclosed, for example, in Japanese Unexamined Patent Application Publication No. 2013-014176.

Meanwhile, a curtain airbag used for a lateral collision of the vehicle has been known. This curtain airbag is deployed in the front-to-rear direction of the vehicle along the insides of the lateral surfaces of the vehicle at a lateral collision, and configured to receive and support the passenger moving outward in the vehicle width direction to protect the passenger at the lateral collision, which is disclosed, for example, in Japanese Unexamined Patent Application Publication No. 2015-067123.

SUMMARY OF THE INVENTION

An aspect of the present invention provides a passenger protection apparatus including an inflator configured to supply gas, and an airbag configured to deploy to surround a sitting position of a passenger by the gas supplied from the inflator. One end of the airbag is supported on an upper portion of a vehicle, and the other end of the airbag contacts an in-vehicle member and is supported by the in-vehicle member.

DETAILED DESCRIPTION

Figure 1:
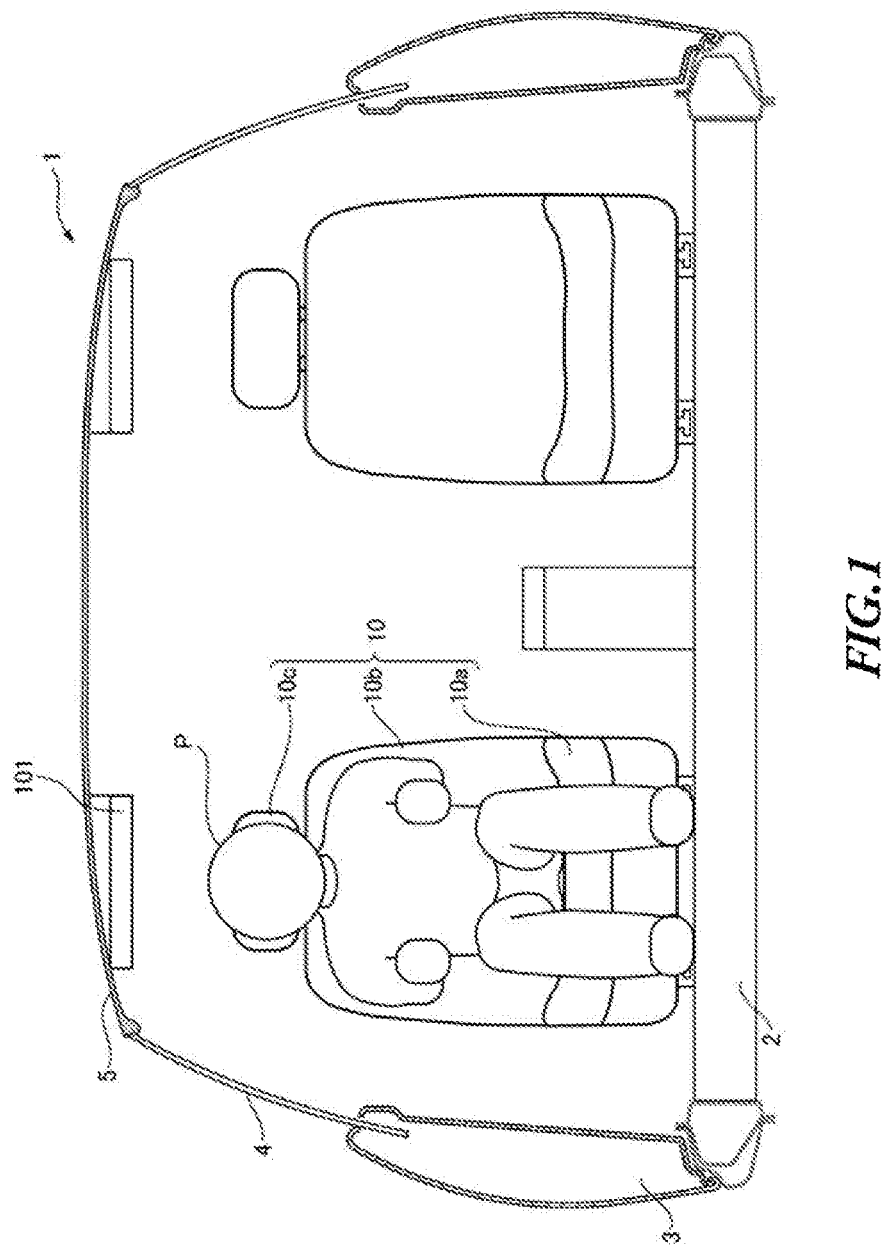
FIG. 1 is a cross-sectional view illustrating an exemplary vehicle equipped with a passenger protection apparatus according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Collisions with the vehicle are not limited to a frontal collision and a lateral collision, but various types of collision in any direction, such as an oblique collision, are conceivable. However, it may not be possible to prepare airbags for each type of collision, because of the high cost and so forth. In addition, the airbag needs to be supported at a predetermined position in order to reliably protect the passenger.

It is desirable to provide a passenger protection apparatus capable of coping with various types of collisions to improve a passenger protection function.

<Configuration of Vehicle 1>

Figure 2:
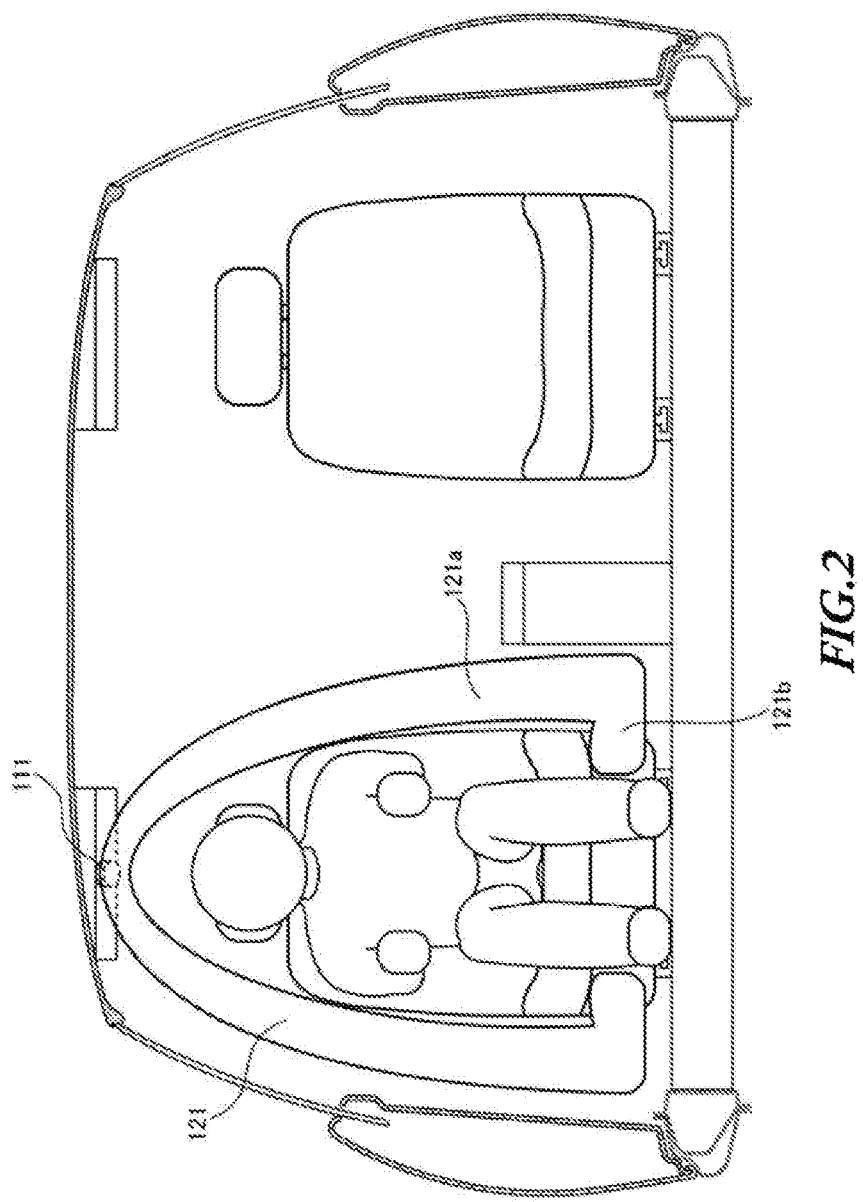
FIG. 2 is a cross-sectional view illustrating a state where the passenger protection apparatus according to an example of the present invention is actuated.

First, the configuration of a vehicle equipped with the passenger protection apparatus according to an example of the present invention will be described. FIG. 1 is a cross-sectional view illustrating a vehicle equipped with the passenger protection apparatus according to an example of the present invention. FIG. 2 is a cross-sectional view illustrating a state where the passenger protection apparatus according to an example of the present invention is actuated.

As illustrated in FIG. 1, seats 10 are mounted to a floor surface 2 of a vehicle 1. Body sides 3 constituting part of the side frame of the vehicle 1 are vertically provided on the right and left sides of the vehicle 1. Pillars 4 extend upward from the body sides 3 to support a ceiling 5 in an approximately horizontal position.

A passenger protection apparatus 101 is provided on the ceiling 5, above each of the seats 10 in the vehicle 1. The seats 10 are, for example, a driver seat and a front passenger seat arranged in the width direction of the vehicle 1, and the same passenger protection apparatus 101 is provided above each of the seats 10. With the present example, the passenger protection apparatus 101 provided above the driver seat (seat 10) in the vehicle 1 with the steering wheel on the right side will be described.

The seat 10 includes a seat bottom 10a on which the hip and thighs of a passenger P rest, a reclining backrest 10b, and a head 10c configured to support the head of the passenger P.

<Configuration of Passenger Protection Apparatus 101>

Next, the configuration of the passenger protection apparatus 101 according to an example of the present invention will be described. Here, with the present example, the passenger protection apparatus 101 is controlled by, for example, an ACU (airbag deployment control unit) and an ECU (electronic control unit). The passenger protection apparatus 101 includes an inflator 111 and an airbag 121.

<Inflator 111>

The inflator 111 ignites explosives upon receiving a signal from an abnormality detector detecting an abnormality of the vehicle 1 such as a collision, or collision prediction, and generates gas by the chemical reaction due to combustion, and then injects the gas into the airbag 121. That is, the inflator 111 is configured to supply the airbag 121 with gas.

<Airbag 121>

The airbag 121 has a pouch-shaped body into which the gas is injected by the inflator 111. When the airbag 121 is not actuated, it is compactly folded. One end of the airbag 121 is held by the passenger protection apparatus 101 fixed to the ceiling 5 of the vehicle 1. That is, one end of the airbag 121 is held in the upper portion of the vehicle 1. The airbag 121 deploys to surround the position of the passenger P sitting on the seat 10. The airbag 121 includes an airbag body 121a and airbag hooks 121b.

The airbag body 121a is hollow and has an approximate conical pouch-shaped body. The airbag body 121a deployed and expanded is large enough to cover the seat bottom 10a of the seat 10 and extend to the level lower than the lower portion of the seat bottom 10a. The airbag hook 121b has a pouch-shaped body protruding inward from the lower portion of the airbag body 121a. In addition, after the airbag body 121a deploys, the airbag hook 121b expands inward from the lower portion of the airbag body 121a and contacts the seat bottom 10a of the seat 10.

With the present example, one of the airbag hooks 121b is provided from the lower portion of the airbag body 121a on the right side, and the other of the airbag hooks 121b is provided from the lower portion of the airbag body 121a on the left side. Here, with the present example, the airbag body 121a has an approximate conical shape. However, this is by no means limiting, and the airbag body 121a may have an approximate cylindrical, pyramid, or prismatic shape.

Communication paths are formed in the lower portion of the airbag body 121a to communicate with the airbag hooks 121b. The gas injected from the inflator 111 first flows into the airbag body 121a, and then flows into the airbag hooks 121b from the airbag body 121a via the communication paths. Therefore, when the airbag 121 expands, the airbag body 121a first expands, and after that, the airbag hooks 121b expand.

<Operation of Passenger Protection Apparatus 101>

Next, the operation of the passenger protection apparatus 101 when the vehicle 1 collides with an object will be described.

In the passenger protection apparatus 101, when the abnormality detector detects an abnormality such as a collision, the inflator 111 is actuated to inject the gas into the airbag 121. When the airbag 121 is supplied with the gas by the inflator 111, the airbag 121 extends downward and the airbag body 121a deploys to enclose the seat 10 and the passenger P sitting on the seat 10.

Then, when the expanding airbag body 121a extends to the lower portion of the seat bottom 10a of the seat 10, the gas flows into the airbag hooks 121b via the communication paths provided in the lower portion of the airbag body 121a. The airbag hooks 121b supplied with the gas expand and protrude inward from the airbag body 121a. By this means, the airbag hooks 121b deploy under the seat bottom 10a of the seat 10, and therefore the upper portions of the airbag hooks 121b contact the lower portion of the seat bottom 10a. Accordingly, the upper portion of the airbag 121 is supported by the passenger protection apparatus 101 fixed to the ceiling 5, and the lower portion of the airbag 121 contacts the lower portion of the seat bottom 10a, and therefore the airbag 121 is held in or fixed to the vehicle 1.

Here, with the present example, the gas is flowed from the inflator 111 into the airbag hooks 121b via the airbag body 121a. However, this is by no means limiting, and the inflators 111 may be individually provided for the airbag body 121a and the airbag hooks 121b. In this case, the gas is flowed from the inflator 111 into the airbag hooks 121b later than when the gas is flowed into the airbag body 121a, and therefore it is possible to expand the airbag hooks 121b later than when the airbag body 121a expands.

In addition, with the present example, one of the airbag hooks 121b is provided from the lower portion of the airbag body 121a on the right side, and the other of the airbag hooks 121b is provided from the lower portion of the airbag body 121a on the left side. However, this is by no means limiting, and the airbag hook 121b may be provided from the lower portion of the airbag body 121a on either side. Otherwise, one or more airbag hooks 121b may be provided in the front-to-back direction, in front of or behind the airbag body 121a, or obliquely with respect to the airbag body 121a.

With the present example, the airbag hooks 121b are provided from the lower portion of the airbag body 121a. However, this is by no means limiting, and the airbag hooks 121b may be provided at the middle of the airbag body 121a. For example, the airbag hooks 121b may be provided at the level of the head 10c and contact the head 10c to support the airbag 121.

Moreover, with the present example, the airbag hooks 121b contact part of the seat 10 to support the airbag 121. However, this is by no means limiting, and the airbag hooks 121b may contact any in-vehicle member or part of the passenger P to support the airbag 121.

<Part of Passenger Protection Apparatus Pulled up by Tether>

Figure 3:
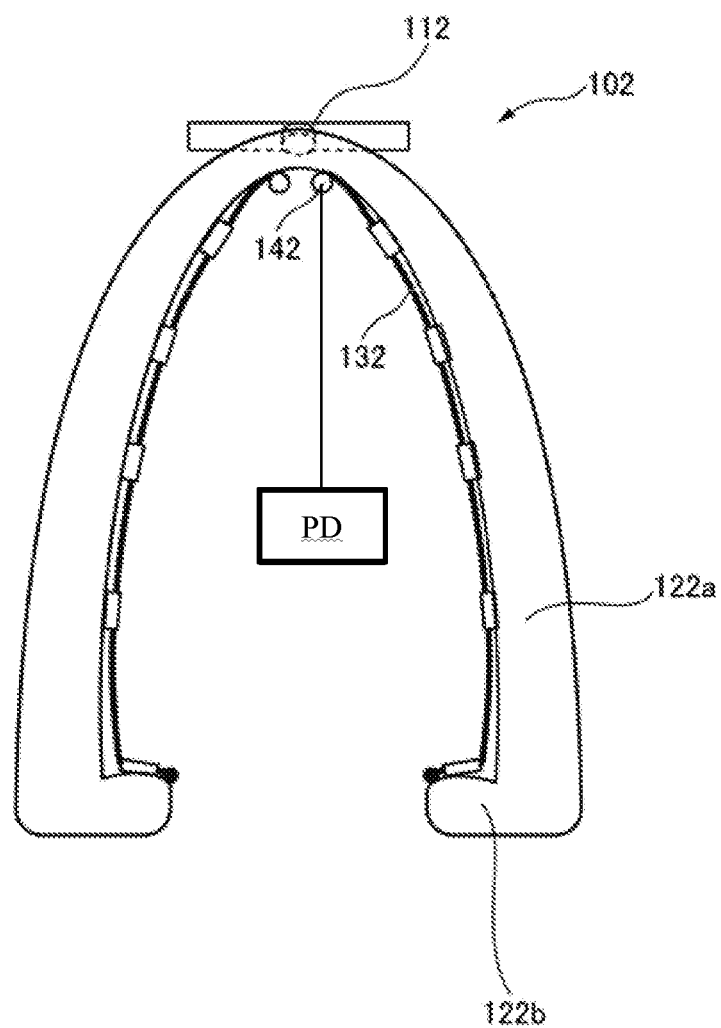
FIG. 3 is a cross-sectional view illustrating a state where a passenger protection apparatus according to another example of the present invention is actuated.

Next, another example of the passenger protection apparatus will be described. In a passenger protection apparatus 102 according to the present example, the airbag hooks 122b are pulled up by using tethers 132. FIG. 3 is a cross-sectional view illustrating a state where the passenger protection apparatus 102 according to the present example is actuated.

As illustrated in FIG. 3, the passenger protection apparatus 102 according to the present example includes an inflator 112, and an airbag 122 in the same way as the passenger protection apparatus 101 according to the above-described example. In addition, the passenger protection apparatus 102 includes tethers 132 and reelers 142. The airbag 122 includes an airbag body 122a and airbag hooks 122b.

The inflator 112, the airbag 122, the airbag body 122a and the airbag hooks 122b are the same as the inflator 111, the airbag 121, the airbag body 121a, and the airbag hooks 121b in the above-described example, respectively.

<Tether 132>

Each of the tethers 132 of the passenger protection apparatus 102 extends as a string. One end of the tether 132 is attached to the reeler 142 disposed on the upper portion of the airbag body 122a so that the tether 132 can be reeled; and the other end of the tether 132 is sewn to the front end of the airbag hook 122b in the inner periphery side. Therefore, the tether 132 connects the upper portion of the airbag body 122a to the front end of the airbag hook 122b in the inner periphery side. After the airbag 122 deploys, the airbag hooks 122b contact the seat bottom 10a of the seat 10 by the tensile force of the tethers 132.

Each of the tethers 132 is provided along the inner wall surface of the airbag body 122a from the upper portion to the lower portion of the airbag body 122a. The tether 132 is hung on the inner wall surface of the airbag body 122a and held at a plurality of positions to prevent the tether 132 from being apart from the inner wall surface of the airbag body 122a. Here, with the present example, the tethers 132 are provided outside of the airbag 122. However, this is by no means limiting, and the tethers 132 may be provided in the airbag 122.

<Reeler 142>

One end of the tether 132 is wound around the reeler 142, so that it is possible to adjust the length of the tether 132. To be more specific, the reeler 142 is actuated to reel the tether 132, so that it is possible to shorten the distance from the other end of the tether 132 sewn to the airbag hook 122b to the one end of the tether 132 wound around the reeler 142. Here, the front end of the airbag hook 122b in the inner periphery side is pulled up by the actuation of the reeler 142.

<Operation of Passenger Protection Apparatus 102>

Next, the operation of the passenger protection apparatus 102 when the vehicle 1 collides with an object will be described.

In the passenger protection apparatus 102, when the abnormality detector detects an abnormality such as a collision, the inflator 112 is actuated to inject the gas into the airbag 122, in the same way as the above-described example. When the airbag 122 is supplied with the gas by the inflator 112, the airbag 122 extends downward and the airbag body 122a deploys to enclose the seat 10 and the passenger P sitting on the seat 10.

Then, when the expanding airbag body 122a extends to the lower portion of the seat bottom 10a of the seat 10, the gas flows into the airbag hooks 122b via the communication paths provided in the lower portion of the airbag body 122a. The airbag hooks 122b supplied with the gas expand and deploy.

Here, the front end of the tether 132 is sewn to the front end of the airbag hook 122b, and therefore the front end of the airbag hook 122b is pulled up as the airbag hook 122b expands. Then, the reeler 142 reels the tether 132 in response to the timing of the deployment of the airbag hook 122b.

By this means, the front end of the airbag hook 122b is further pulled up, and therefore the airbag hook 122b surely contacts the lower portion of the seat bottom 10a. Accordingly, the upper portion of the airbag 122 is supported by the passenger protection apparatus 102 fixed to the ceiling 5, and the lower portion of the airbag 122 contacts the lower portion of the seat bottom 10a, and therefore the airbag 122 is surely held in or fixed to the vehicle 1.

<Passenger Protection Apparatus with Passenger Detector>

In the passenger protection apparatus 102 according to the present example, it is possible to adjust the length of tether 132 to be reeled, depending on the physical size and the posture of the passenger P. To be more specific, the passenger protection apparatus 102 includes a passenger detector PD configured to detect the position of the passenger P to determine, for example, the sitting position, the physical size and the posture of the passenger P. Then, the reeler 142 adjusts an amount of the tether 132 to be reeled based on the conditions of the passenger P as determined by passenger detector PD.

Here, the tether 132 may be reeled by the reeler 142 when the passenger protection apparatus 102 is actuated. However, this is by no means limiting, and the tether 132 may be reeled in advance depending on the physical size and so forth detected by the passenger detector PD. Alternatively, the tether 132 is reeled to some extent in advance depending on the physical size and so forth of the passenger P, and then the amount of the tether 132 to be reeled may be adjusted when the passenger protection apparatus 102 is actuated.

<Passenger Protection Apparatus with Annular Airbag Hook>

Figure 4:
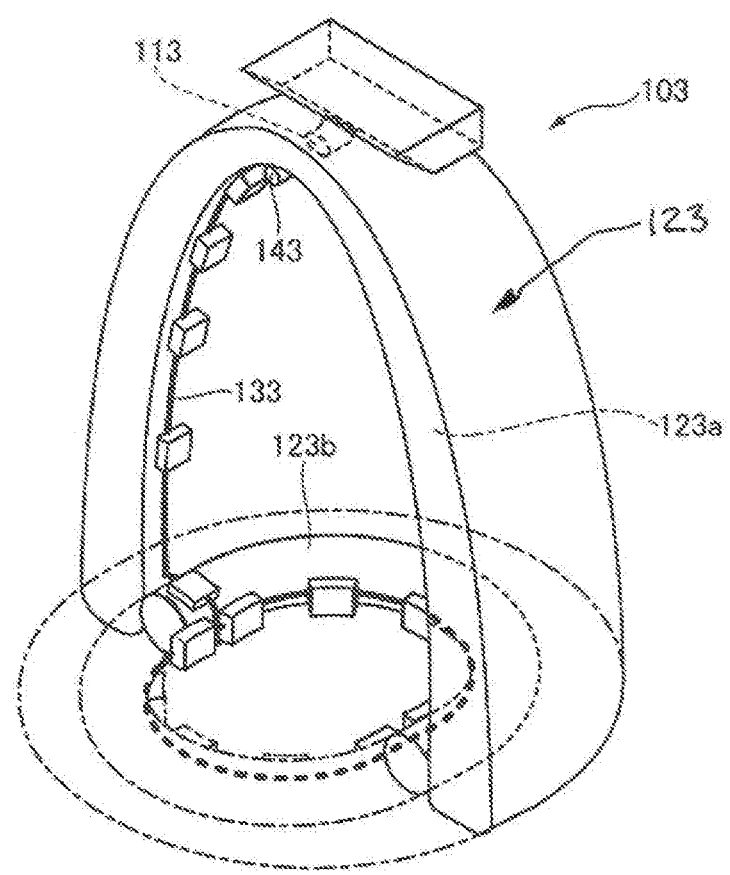
FIG. 4 is a perspective view illustrating a state where a passenger protection apparatus according to another example of the present invention is actuated.

Next, another example of the passenger protection apparatus will be described. With the present example, a passenger protection apparatus 103 includes an annular airbag hook 123b. FIG. 4 is a cross-sectional view illustrating a state where the passenger protection apparatus 103 is actuated.

As illustrated in FIG. 4, the passenger protection apparatus 103 includes an inflator 113, an airbag 123, a tether 133 and a reeler 143 in the same way as the passenger protection apparatus 102 according to the above-described example. The airbag 123 includes an airbag body 123a and the airbag hook 123b.

The inflator 113 is the same as the inflator 112 according to the above-described example.

<Airbag 123>

The airbag 123 includes the airbag body 123a and the airbag hook 123b. One end of the airbag 123 is supported by the passenger protection apparatus 103 fixed to the ceiling 5 of the vehicle 1, in the same way as the airbag 122 according to the above-described example.

Like the airbag body 122a according to the above-described example, the airbag body 123a has a hollow conical pouch-shaped body. The airbag hook 123b is provided along the circumference of the lower end of the airbag body 123a. A plurality of communication paths are provided in the airbag body 123a to communicate with the airbag hook 123b.

The airbag hook 123b has an annular pouch-shaped body, and is provided to expand inward along the inner periphery of the lower portion of the airbag body 123a. As described above, the communication paths are provided between the airbag body 123a and the airbag hook 123b. Accordingly, after the airbag body 123a is expanded by the gas injected from the inflator 113, the gas is flowed into the airbag hook 123b to expand the airbag hook 123b.

<Tether 133>

One end of the tether 133 is attached to the reeler 143 provided on the upper portion of the airbag body 123a so that the tether 133 can be reeled. The tether 133 extends downward from the upper portion of the airbag body 123a along the inner wall surface of the airbag body 123a; extends from the lower portion of the airbag body 123a across the side surface of the airbag hook 12b; and goes around the inner periphery of the airbag hook 123b. That is, the tether 133 is annularly provided along the airbag hook 123b.

A tether junction ring is provided on the side surface of the airbag hook 123b. The tether 133 extending from the upper portion of the airbag body 123a through the tether junction ring, goes around the inner periphery of the airbag hook 123b, passes through the tether junction ring again, and returns to the upper portion of the airbag body 123a. After going around the inner periphery of the airbag hook 123b, the tether 133 passes through the tether junction ring and meets the tether 133 extending from the upper portion of the airbag body 123b, and returns to the reeler 143 along the side surface of the airbag hook 123b and the inner wall surface of the airbag body 123a, so that the other end of the tether 133 is attached to and reeled by the reeler 143.

By this means, the airbag 123 as a drawstring pouch can be drawn by the tether 133 at the airbag hook 123b as the opening of the pouch. For example, the inner diameter of the airbag hook 123b is reduced by the tensile force of the tether 133, or by reeling the tether 133 by the reeler 143 as the airbag 123 deploys, and therefore the airbag hook 123b contacts the seat bottom 10a of the seat 10.

<Reeler 143>

One end or the other end of the tether 133 is wound around the reeler 143, and the length of the tether 133 can be adjusted by the reeler 143. The reeler 143 is actuated no reel the tether 133 so as to reduce the length of the tether 133 provided on the inner periphery of the airbag hook 123b, and to reel the tether 133 so as to reduce the distance from the upper portion of the airbag body 123a to the inner periphery of the airbag hook 123b. Accordingly, the front end of the airbag hook 123b in the inner periphery side is pulled up by the actuation of the reeler 143.

Here, with the present example, the tether 133 turns around in the tether junction ring to reel both ends of the tether 133 by the reeler 143. However, this is by no means limiting, and only one end of the tether 133 may be reeled by the reeler 143 while the other end of the tether 133 is attached to the tether junction ring.

<Operation of Passenger Protection Apparatus 103>

Next, the operation of the passenger protection apparatus 103 when the vehicle 1 collides with an object will be described.

In the passenger protection apparatus 103, when the abnormality detector detects an abnormality such as a collision, the inflator 113 is actuated to inject the gas into the airbag 123, in the same way as the above-described example. When the airbag 123 is supplied with the gas by the inflator 113, the airbag 123 extends downward and the airbag body 123a deploys to enclose the seat 10 and the passenger P sitting on the seat 10.

Then, when the expanding airbag body 123a extends to the lower portion of the seat bottom 10a of the seat 10, the gas flows into the airbag hook 123b via the communication paths provided in the lower portion of the airbag body 123a. The airbag hook 123b supplied with the gas expands and deploys in a ring shape.

Here, the tether 133 is provided on the inner periphery of the airbag hook 123b, and therefore the airbag hook 123b is pulled up as it expands. The reeler 143 reels the tether 133 in response to the timing of the development of the airbag hook 123b.

By this means, the airbag hook 123b is further pulled up, and therefore surely contacts the lower portion of the seat bottom 10a. In addition, the airbag hook 123b has an annular shape, and therefore does not remove from the seat 10 even though a force is applied to the airbag hook 123b in all directions. Accordingly, the upper portion of the airbag 123 is supported by the passenger protection apparatus 103 fixed to the ceiling 5, and the lower portion of the airbag 123 is fitted in the seat 10, and therefore the airbag 123 is surely held in or fixed to the vehicle 1.

<Passenger Protection Apparatus for Bench Seat>

Figure 5:
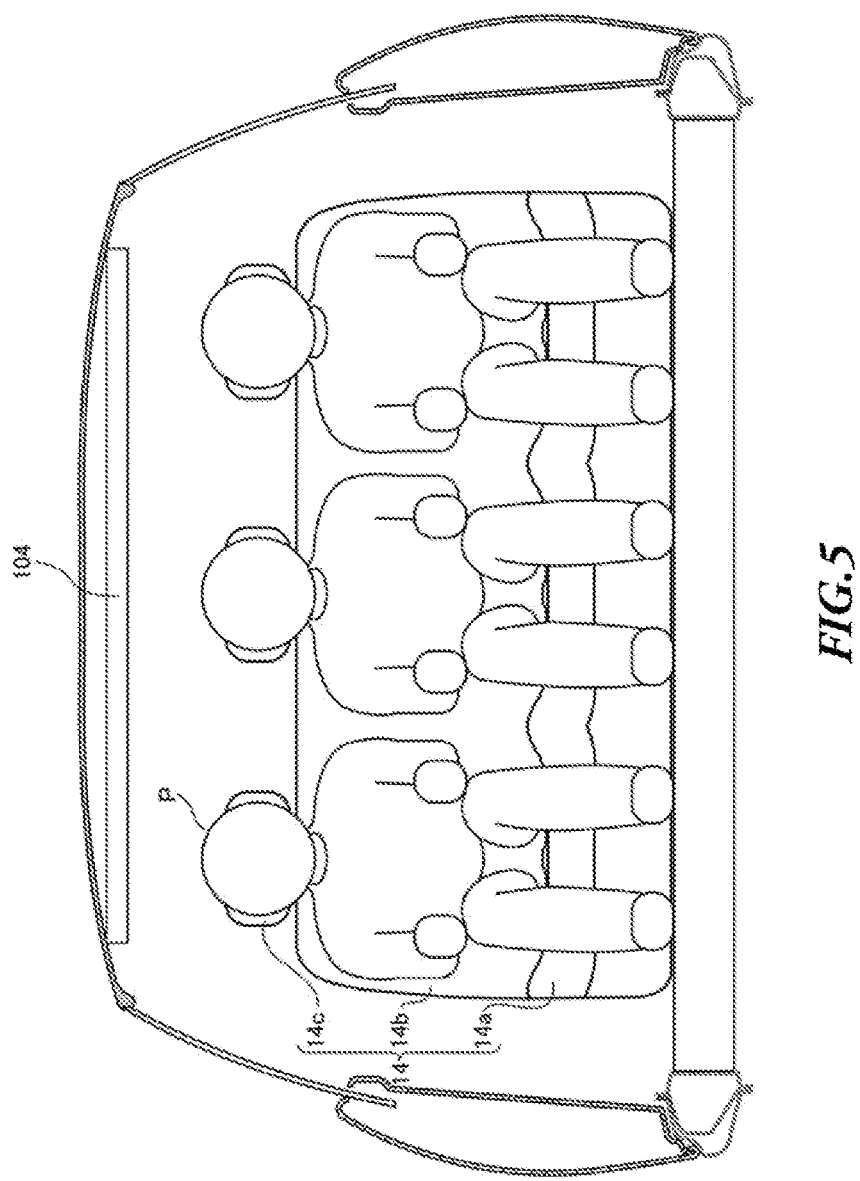
FIG. 5 is a cross-sectional view illustrating a vehicle equipped with the passenger protection apparatus according to another example of the present invention.
Figure 6:
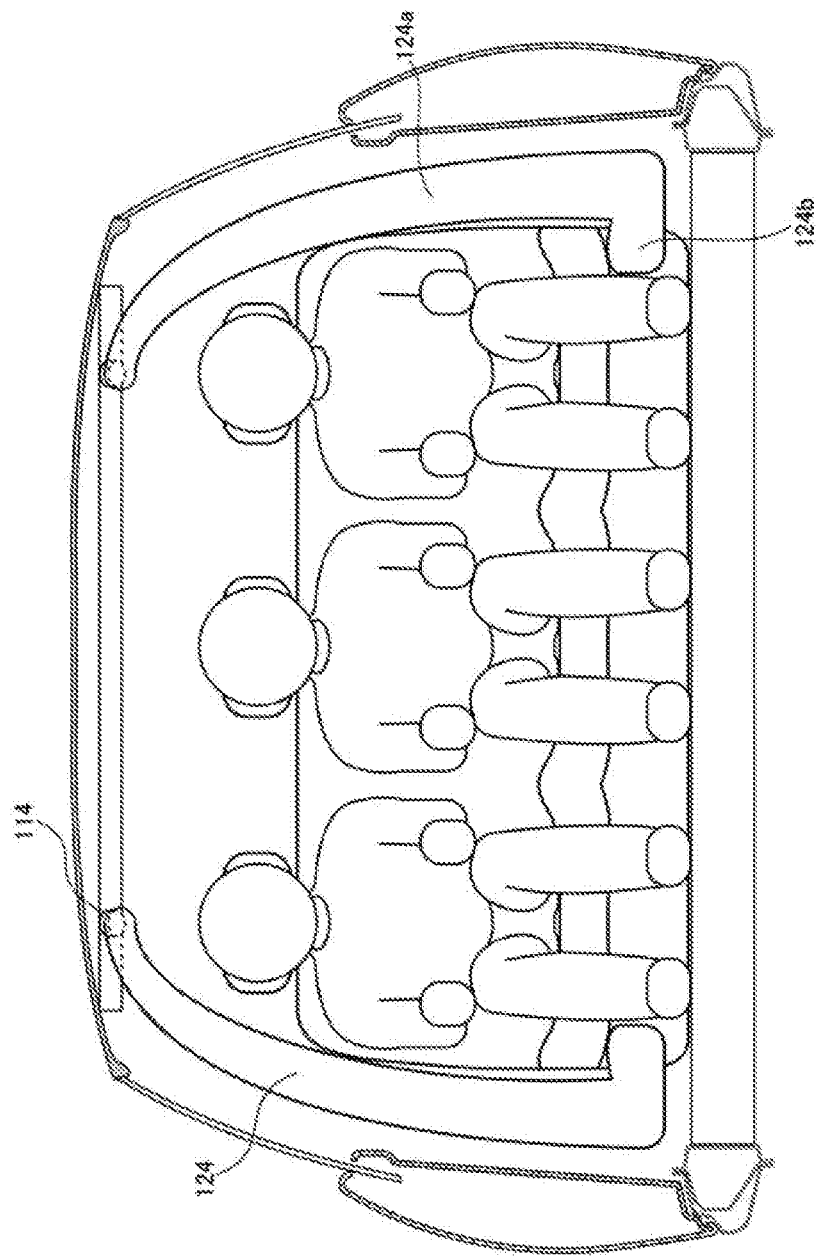
FIG. 6 is a cross-sectional view illustrating a state where the passenger protection apparatus according to another example of the present invention is actuated.

Next, another example of the passenger protection apparatus will be described. A passenger protection apparatus 104 according to the present example is applied to a bench seat 14 having a seat for a plurality of passengers. FIG. 5 is a cross-sectional view illustrating the vehicle 1 equipped with the passenger protection apparatus 104 according to the present example. FIG. 6 is a cross-sectional view illustrating a state where the passenger protection apparatus 104 according to the present example is actuated.

As illustrated in FIGS. 5, and 6, the passenger protection apparatus 104 according to the present example includes an inflator 104 and an airbag 124 in the same way as the passenger protection apparatus 101 according to the above-described example.

<Inflator 114>

The inflator 114 ignites explosives upon receiving a signal from the abnormality detector detecting an abnormality of the vehicle 1 such as a collision, and generates gas by the chemical reaction due to combustion, and then injects the gas into the airbag 124. The main function of the inflator 114 is the same as the inflator 111 according to the above described example. Meanwhile, the size of the airbag 124 supplied with the gas is larger than the airbag 121 according to the above-described example, and therefore an amount of gas injected into the airbag 124 by the inflator 114 is greater than that of the airbag 121.

<Airbag 124>

The airbag 124 has a pouch-shaped body into which the gas is injected by the inflator 114. The size of the airbag 124 is larger than that of the airbag 121 according to the above-described example. To be more specific, the size of the airbag 124 is large enough to cover three passengers P. When the airbag 124 is not actuated, it is compactly folded. The upper portion of the airbag 124 is supported by the passenger protection apparatus 104 at a position above the sitting position of the passenger P on the right of the bench seat 14, and at a position above the sitting position of the passenger P on the left of the bench seat 14.

The airbag 124 includes an airbag body 124a and airbag hooks 124b. When the airbag body 124a having a pouch-shaped body deploys and expands, the size of the pouch-shaped body is large enough to cover the three passengers P sitting on the bench seat 14. Each of the airbag hooks 124b has a pouch-shaped body protruding inward from the lower portion of the airbag body 124. One of the airbag hooks 124b is provided from the lower portion of the airbag body 124a on the right side, and the other of the airbag hooks 124b is provided from the lower portion of the airbag body 124a on the left side.

Here, the airbag hooks 124b may not necessarily be provided from the lower portion of the airbag body 124a on the right and left sides, but may be provided on either side. Otherwise, the airbag hook 124b may be provided each between the passengers P. Otherwise, one or more airbag hooks 124b may be provided in the front-to-back direction, in front of or behind the airbag body 124a, or obliquely with respect to the airbag body 124a. Otherwise, the airbag hooks 124b may be provided at the level of a head 14c of the bench seat 14 and contact the head 14c to support the airbag 124.

The airbag body 124a and the airbag hooks 124b communicate with each other via the communication paths. The gas injected from the inflator 114 flows into the airbag body 124a, and then flows into the airbag hooks 124b from the airbag body 124a via the communication paths.

<Operation of Passenger Protection Apparatus 104>

Next, the operation of the passenger protection apparatus 104 when the vehicle 1 collides with an object will be described.

In the passenger protection apparatus 104, when the abnormality detector detects an abnormality such as a collision, the inflator 114 is actuated to inject the gas into the airbag 124, in the same way as the above-described examples. When the airbag 124 is supplied with the gas by the inflator 114, the airbag 124 extends downward and the airbag body 124a deploys to enclose the bench seat 14 and the passengers P sitting on the bench seat 14.

Then, when the expanding airbag body 124a extends to the lower portion of a seat bottom 14a of the bench seat 14, the gas flows into the airbag hooks 124b via the communication paths provided in the lower portion of the airbag body 124a. The airbag hooks 124b supplied with the gas expand and deploy.

By this means, the airbag hooks 124b deploy under the seat bottom 14a of the bench seat 14, so that the upper portions of the airbag hooks 124a contact the lower portion of the seat bottom 14a. Accordingly, the upper portion of the airbag 124 is supported by the passenger protection apparatus 104 fixed to the ceiling 5, and the lower portion of the airbag 124 contacts the lower portion of the seat bottom 14a, and therefore the airbag 124 is held in or fixed to the vehicle 1.

Here, the passenger protection apparatus 104 may include a tether and a reeler in the same way as the above-described example.

As described above, the airbag is supported by or fixed to the seat or the bench seat while protecting the passenger(s), and therefore the passenger protection apparatus according to the above-described examples can absorb an impact on the vehicle 1 in any direction and cope with various types of collisions, and therefore improve the passenger protection function.

Here, with the above-described examples, the seat is provided to face the traveling direction of the vehicle 1. However, this is by no means limiting, and the seat may face backward or sideways. In this case, the passenger protection apparatus covers the whole seat, and therefore it is possible to surely protect the passenger(s).

The invention claimed is:

1. A passenger protection apparatus comprising:
an inflator configured to supply gas; and
an airbag configured to deploy to surround a sitting position of a passenger by the gas supplied from the inflator, the airbag including a main body portion and an in-vehicle contact portion extending from the main body portion, and wherein one end of the airbag is supported on an upper portion of a vehicle and the other end of the airbag is defined by an end of the in-vehicle contact portion, which in-vehicle contact portion angles away from the main body portion into a contacting and airbag position support arrangement with an in-vehicle member.

2. The passenger protection apparatus according to claim 1, wherein after the main body portion deploys, the in-vehicle contact portion of the airbag expands inward while angling away from the main body portion into contact with the in-vehicle member.

3. The passenger protection apparatus according to claim 2, further comprising a tether configured to couple the other end to an upper portion of the airbag,
wherein after the main body portion deploys, the other end of the airbag contacts the in-vehicle member by a tensile force of the tether.

4. The passenger protection apparatus according to claim 3, wherein the tether extends in a vertical direction along an inner surface of the airbag and is attached to the inner surface of the airbag.

5. The passenger protection apparatus according to claim 3, further comprising a reeler configured to adjust a length of the tether.

6. The passenger protection apparatus according to claim 5, further comprising a passenger detector configured to detect a position of the passenger,
wherein the reeler adjusts the length of the tether on a basis of the detected position of the passenger.

7. The passenger protection apparatus according to claim 2, wherein:
a tether is annularly provided on the other end of the airbag; and
an inner diameter of the other end of the airbag is reduced as the airbag deploys, and the other end of the airbag contacts the in-vehicle member.

8. The passenger protection apparatus according to claim 7, wherein the tether extends in a vertical direction along an inner surface of the airbag and is attached to the inner surface of the airbag.

9. The passenger protection apparatus according to claim 7, further comprising a reeler configured to adjust a length of the tether.

10. The passenger protection apparatus according to claim 9, further comprising a passenger detector configured to detect a position of the passenger,
wherein the reeler adjusts the length of the tether on a basis of the detected position of the passenger.

11. The passenger protection apparatus according to claim 1, wherein the in-vehicle contact portion of the airbag is configured as to expand away from a lower end of the main body portion so as to catch an undersurface of the in-vehicle member such that there is achieved, in conjunction with the one end of the airbag supported on the upper portion of the vehicle, the contacting and airbag position support arrangement of the in-vehicle contact portion of the airbag with the in-vehicle member.

12. The passenger protection apparatus according to claim 11 wherein the in-vehicle contact portion of the airbag is configured to catch the underside of a vehicle seat that represents the in-vehicle member.

13. A passenger protection apparatus comprising:
an inflator configured to supply gas;
an airbag configured to deploy to surround a sitting position of a passenger by the gas supplied from the inflator, one end of the airbag being supported on an upper portion of a vehicle and the other end of the airbag contacting an in-vehicle member and being supported by the in-vehicle member; and
a tether configured to couple the other end to an upper portion of the airbag,
wherein the other end of the airbag contacts the in-vehicle member by a tensile force of the tether.

14. The passenger protection apparatus according to claim 13, wherein the tether extends in a vertical direction along an inner surface of the airbag and is attached to the inner surface of the airbag.

15. The passenger protection apparatus according to claim 13, further comprising a reeler configured to adjust a length of the tether.

16. The passenger protection apparatus according to claim 15, further comprising a passenger detector configured to detect a position of the passenger,
wherein the reeler adjusts the length of the tether on a basis of the detected position of the passenger.

17. A passenger protection apparatus comprising:
an inflator configured to supply gas;
an airbag configured to deploy to surround a sitting position of a passenger by the gas supplied from the inflator, one end of the airbag being supported on an upper portion of a vehicle and the other end of the airbag contacting an in-vehicle member and being supported by the in-vehicle member; and
a tether that is annularly provided on the other end of the airbag; and an inner diameter of the other end of the airbag is reduced as the airbag deploys, and the other end of the airbag contacts the in-vehicle member.

18. The passenger protection apparatus according to claim 17, wherein the tether extends in a vertical direction along an inner surface of the airbag and is attached to the inner surface of the airbag.

19. The passenger protection apparatus according to claim 17, further comprising a reeler configured to adjust a length of the tether.

20. The passenger protection apparatus according to claim 19, further comprising a passenger detector configured to detect a position of the passenger,
wherein the reeler adjusts the length of the tether on a basis of the detected position of the passenger.

* * * * *